(12) United States Patent
Michael

(10) Patent No.: US 8,739,458 B1
(45) Date of Patent: Jun. 3, 2014

(54) FLOAT FISHING APPARATUS AND METHOD

(76) Inventor: Steven S. Michael, Randleman, NC (US)

( * ) Notice: Subject to any disclaimer, the term of this patent is extended or adjusted under 35 U.S.C. 154(b) by 485 days.

(21) Appl. No.: 13/221,989

(22) Filed: Aug. 31, 2011

(51) Int. Cl.
*A01K 97/12* (2006.01)

(52) U.S. Cl.
USPC ...................................... 43/15; 43/16; 43/4.5

(58) Field of Classification Search
USPC ................................ 43/15, 16, 4.5
See application file for complete search history.

(56) References Cited

U.S. PATENT DOCUMENTS

| | | | | |
|---|---|---|---|---|
| 2,784,515 A | * | 3/1957 | McBride et al. | 43/15 |
| 3,766,680 A | * | 10/1973 | Torme et al. | 43/16 |
| 4,309,838 A | * | 1/1982 | Hodshire | 43/15 |
| 5,168,651 A | * | 12/1992 | Wilson | 43/17 |
| 6,105,299 A | * | 8/2000 | Rich | 43/15 |
| 6,763,629 B1 | * | 7/2004 | Bennett | 43/16 |
| 8,196,335 B2 | * | 6/2012 | Flecha | 43/15 |
| 2006/0254121 A1 | * | 11/2006 | Huynh | 43/44.95 |
| 2012/0131841 A1 | * | 5/2012 | Galbraith | 43/16 |

* cited by examiner

*Primary Examiner* — Christopher P Ellis
(74) *Attorney, Agent, or Firm* — Blake P. Hurt

(57) ABSTRACT

A float fishing apparatus and method of use are described primarily for fishing in lakes and ponds. The apparatus includes a cylindrical weight inside an elongated hollow shaft which will readily slide to upright the fishing apparatus from a horizontal position to a vertical position when a successful struck by a fish is made. An LED light casts a broad light pattern on the water when the apparatus is in an upright position to easily identify the state of the fishing apparatus. A rotatable reel with attached fishing line allows the line to be adjusted to a desired length and can then be secured with a reel catch to secure the reel in a non-rotatable position.

19 Claims, 5 Drawing Sheets

FLOAT FISHING APPARATUS AND METHOD

FIELD OF THE INVENTION

The invention herein pertains to fishing apparatus and particularly pertains to float or "Jug" fishing apparatus.

DESCRIPTION OF THE PRIOR ART AND OBJECTIVES OF THE INVENTION

"Jug" or float fishing devices have been used in the past for fishing in ponds and lakes. The first devices consisted of a container such as a sealed gallon milk jug with a fishing line and hook attached thereto. The fisherman would sometimes row to the center of the lake and place a dozen or so of these "jugs" in the lake. Later, on observing the jug bobbing he would then retrieve the jug with the caught fish. In the more recent past a floatable shaft has been used in place of a jug which contains a weighted ball. When the bait is struck by a fish the shaft will turn upright in the water as the weighted ball is forced by gravity to the end of the shaft with the fishing line attached.

While the above-identified devices generally work well in the daytime, at night they are difficult to see and easy to lose after a few hours, particularly on large lakes having currents, waves or during inclement weather. Further, the older float fishing devices are difficult to accurately adjust the line length and bait depth since they do not have reels attached to them.

Thus, in view of the problems and disadvantages associated with prior art float fishing devices, the present invention was conceived and one of its objectives is to provide a float fishing apparatus and method of use which will prevent or lessen the apparatus from becoming lost or hidden while fishing at night.

It is another objective of the present invention to provide a float fishing apparatus having a hollow shaft which includes a cylindrical weight which readily slides therein.

It is still another objective of the present invention to provide a float fishing apparatus which uses a reel and catch for easily adjusting the length of the line and bait depth used.

It is yet another objective of the present invention to provide a float fishing apparatus which is relatively inexpensive to make and purchase.

It is a further objective of the present invention to provide a float fishing apparatus which can be easily seen at night.

It is still a further objective of the present invention to provide a float fishing apparatus which allows a caught fish to be easily removed from the hook.

Various other objectives and advantages of the present invention will become apparent to those skilled in the art as a more detailed description is set forth below.

SUMMARY OF THE INVENTION

The aforesaid and other objectives are realized by providing a float fishing apparatus for a pond or lake having a hollow shaft containing a slideable cylindrical weight therein. A reel is supported on the shaft for containing cord or fishing line which is guided by a series of eyelets positioned along one end of the shaft. A hook is affixed to the fishing line as is conventional. A battery operated light assembly is attached to the shaft at the end opposite the eyelets and includes a conventional LED penlight therein. A resilient light housing with a reflector protects the penlight from water and is utilized to activate or deactivate the penlight. A floatation collar having a reflective band therearound is positioned between the light assembly and reel to keep the apparatus afloat.

In use at night, the hook is baited, the line sufficiently unwound from the reel which is then locked in place by a pivotable reel catch, the light assembly squeezed to active the penlight and the float fishing apparatus is positioned horizontally on top of the water with the weight proximate the light assembly whereby the line and hook with bait will descend into the water. When a successful strike by a fish is made, the fish pulls on the hook in an attempt to get away. The cylindrical weight in the shaft slides downwardly towards the line eyelets and hook and the float fishing apparatus uprights to a vertical position. The light assembly is then more visible as the reflector casts a large pattern of light on the water surface for easy viewing.

The method of use includes the steps of placing the float fishing apparatus horizontally in the water with the lighting apparatus activated. A successful strike will pivot the apparatus to an upright, vertical position with the light easily visible from a distance to allow the user to quickly retrieve the float fishing apparatus and reel in the caught fish. The fish can then be released from the hook and placed in a cooler or container by manipulating the fish against the edge of the cooler as the hook engages the terminal eyelet.

DETAILED DESCRIPTION OF THE PREFERRED EMBODIMENTS AND OPERATION OF THE INVENTION

Figure 1:
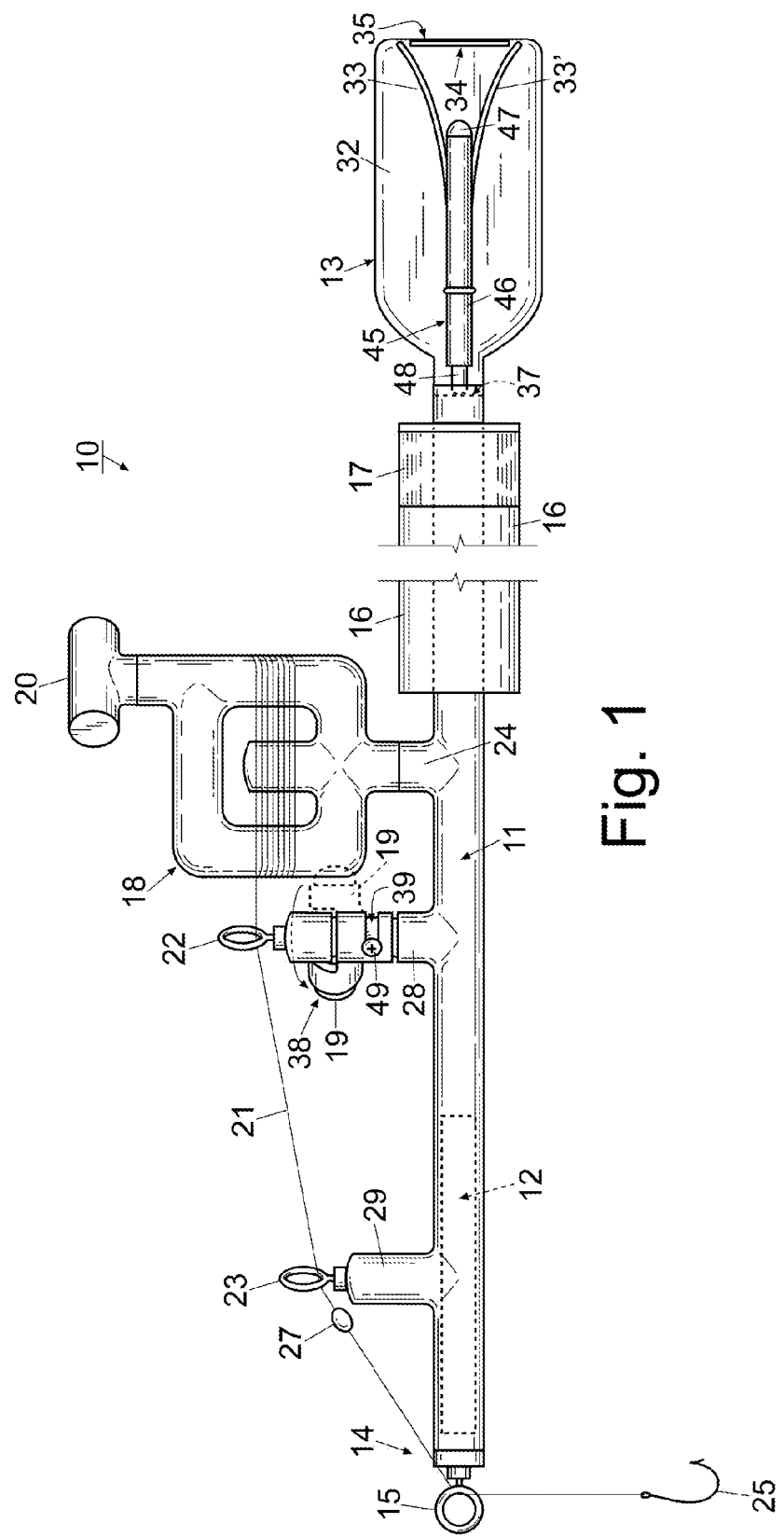
FIG. 1 schematically shows the float fishing apparatus of the invention in fragmented fashion with the reel catch in an open posture and the closed posture shown in dotted line fashion.

For a better understanding of the invention and its method of use, turning now to the drawings, preferred float fishing apparatus 10 is shown in FIG. 1 having hollow shaft 11 containing cylindrical weight 12 therein. As would be understood, weight 12 can slide almost the entire length of shaft 11 from light assembly 13 to distal end 14 having eyelet 15 attached parallel to shaft 11. Shaft 11 is preferably formed from a tubular material such as standard PVC piping or could be formed from other suitable materials such as aluminum. Floatation collar 16 is made from a floatable, lightweight polyfoam and includes reflective band 17 consisting of usual reflective tape which is adhered to the outer surface of floatation collar 16. Reel 18 is rotatably mounted on reel support 24 which is affixed to shaft 11 and includes handle 20 which is pivotably mounted thereon for winding and unwinding fishing line 21 affixed thereto. Standard fishing line 21 passes through eyelets 22, 23 and terminal eyelet 15 affixed to shaft 11. Hook 25 is a conventional fishing hook affixed to fishing line 21 as usual along with standard line weight 27. As also seen in FIG. 1, eyelets 22, 23 are affixed to respectively, posts 28, 29 for easily directing line 21 from reel 18 to eyelet 15 which is affixed to distal end 14 of shaft 11 to assist in preventing hook 25 from snags or catching reel 18 or shaft 11. Post 28 includes adjustable reel catch 19 which is pivotably affixed thereto for locking reel 18 in place as needed (seen rotated in outline fashion locked). Reel catch 19 includes slot 39 formed therein which engages and is rotatable on pin 49 which is rigidly affixed to post 28. Reel catch 19 has a somewhat V-shape at free end 38 for receiving and maintaining reel 18 therein. Pin 49 limits the rotation of reel catch 19 about post 28. Apparatus 10 is less dense then water and will readily float in a lake or pond.

Figure 3:
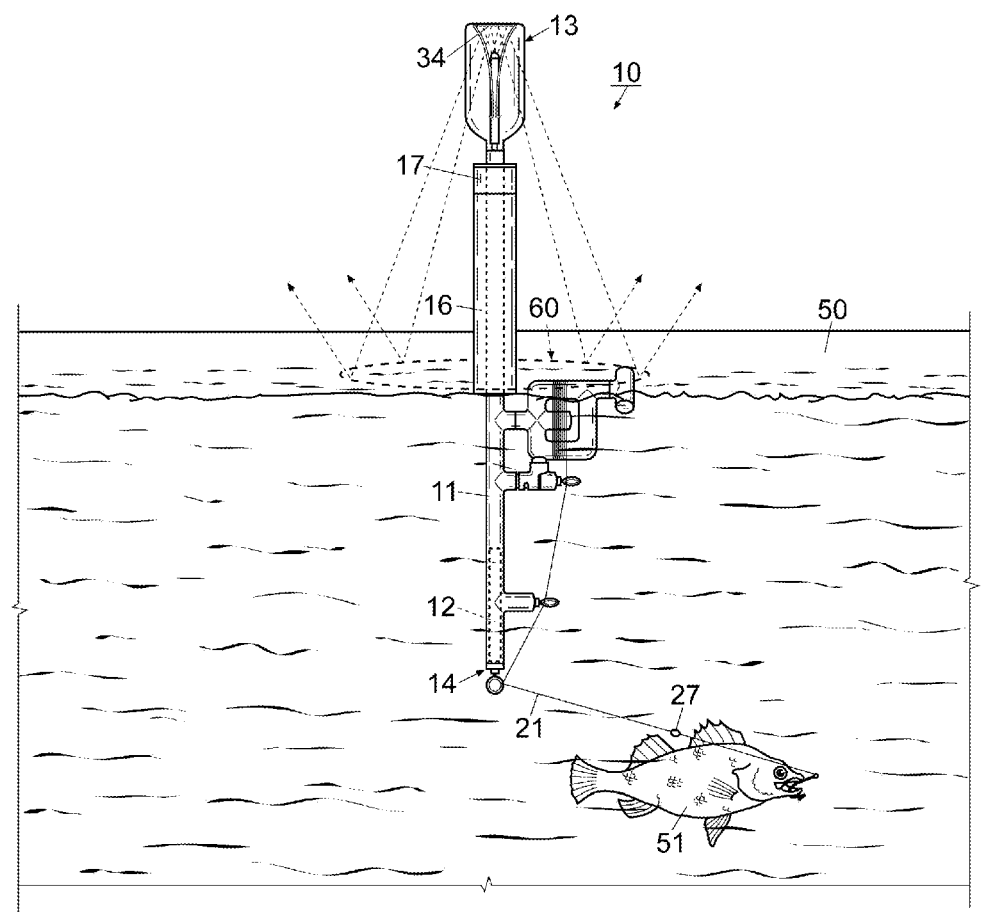
FIG. 3 illustrates the float fishing apparatus seen in FIG. 2 in an upright, vertical position after a strike and a fish on the hook.
Figure 4:
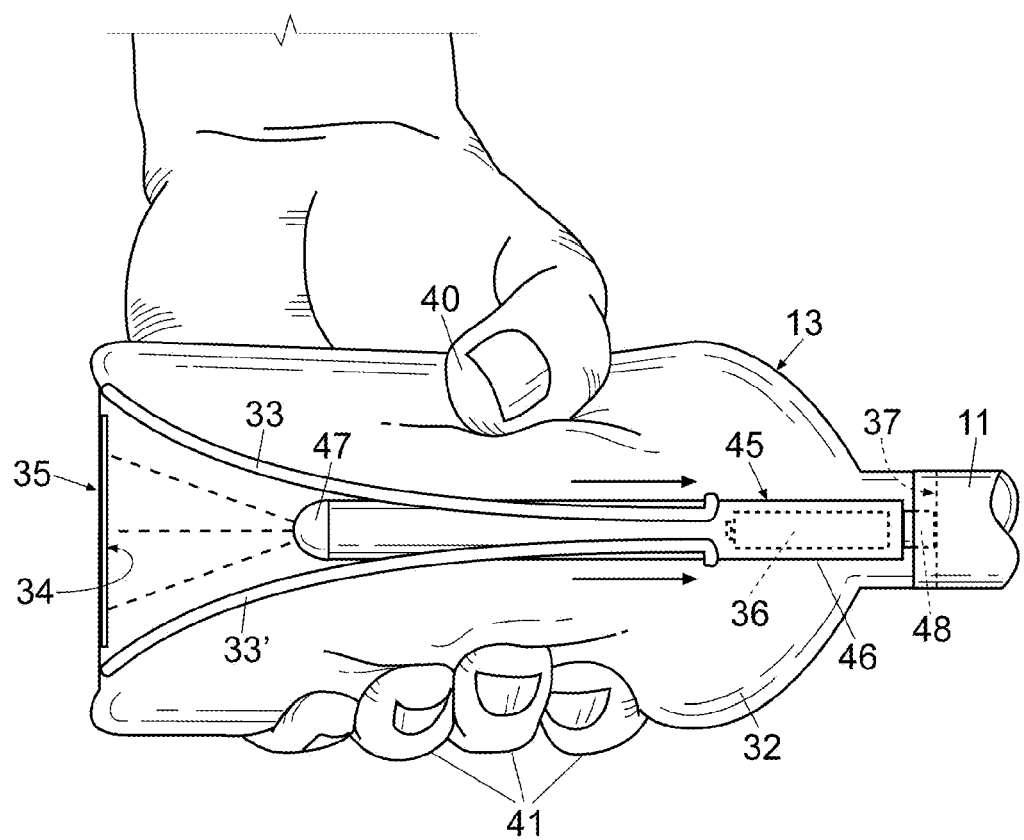
FIG. 4 depicts an enlarged view of the light assembly.

As further shown in FIG. 1, light assembly 13 includes a transparent outer housing 32, which is formed from a resilient plastic, as further shown in FIG. 4 and is threadably attached to shaft 11. By manually squeezing housing 32 as shown schematically in FIG. 4 housing 32 is deformed or compressed due to pressure from thumb 40 and fingers 41, effectively shortening the length of housing 32. When housing 32 is so deformed or shortened, pressure is applied to wire spacers 33, 33' forcing barrel 46 of penlight 45 towards shaft 11. Penlight 45 is conventional and includes LED 47 at one end, battery 36 within barrel 46 and pressure switch 48 at the opposite end. When housing 32 is so squeezed or deformed, pressure switch 48 is depressed as it strikes stop 37 of shaft 11, alternately turning on or off LED 47 of penlight 45. Reflector 34 shown on the inside of top 35 of housing 32 consists of an aluminum plate or foil which is adhered to the inside of top 35 opposing LED 47. Thus when housing 32 is deformed and penlight 45 activated, light rays from LED 47 are mirrored off of reflector 34 and form a large light pattern 60 as seen in FIG. 3. Penlight 45 is battery operated and as would be understood light assembly 13 can be removed from shaft 11 and battery 36 replaced as needed.

Figure 2:
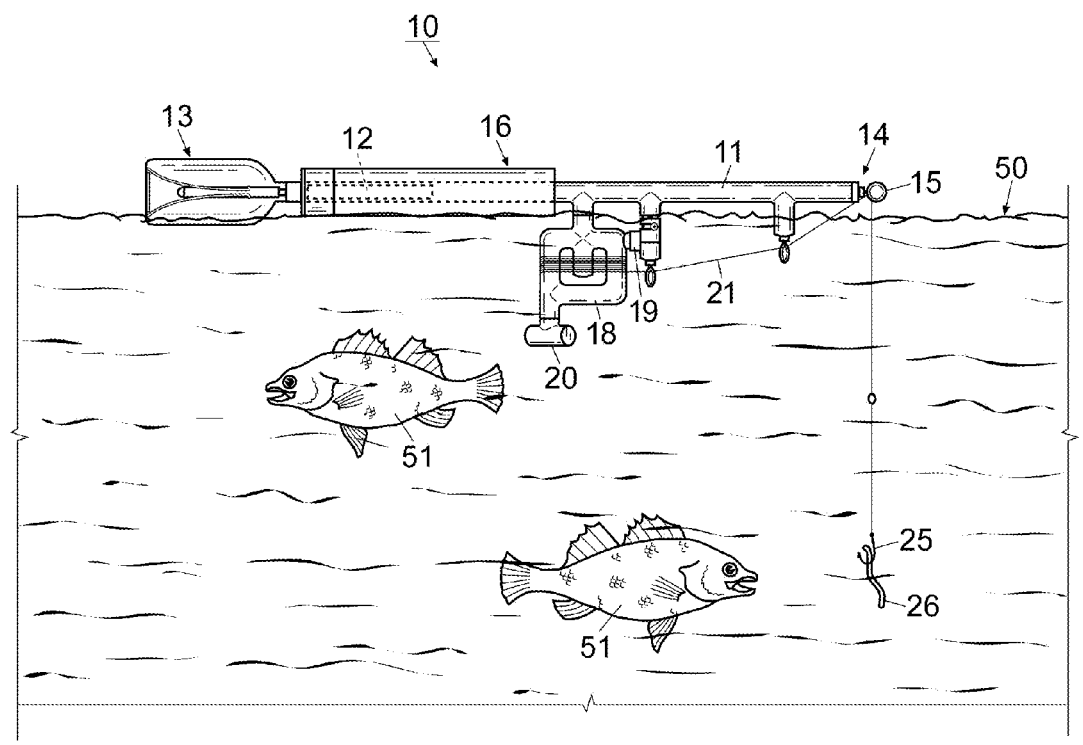
FIG. 2 pictures the float fishing apparatus as seen in FIG. 1 in a horizontal position floating on a lake with the hook baited and submersed in the water.

In the preferred method of use, float fishing apparatus 10 is shown in FIG. 2 placed in a horizontal position on top of water 50 which may be in a pond, lake or the like. Reel 18 is shown with fishing line 21 partially unwound with hook 25 having conventional bait 26 affixed thereto in water 50. Reel catch 19 has engaged reel 18 to prevent further unwinding of line 21. Once fish 51 strikes bait 26 and is engaged with hook 25 as seen in FIG. 3, line 21 is tightened, applying pressure to distal end 14 causing distal end 14 to dip deeper into water 50, whereby gravity forces weight 12 to slide downwardly toward distal end 14, causing shaft 11 to sink further into water 50. Fishing apparatus 10 is then no longer horizontal, and stands upright or assumes a vertical posture in water 50 as shown in FIG. 3. In this posture penlight 45 shining on reflector 34 forms a wide light pattern 60 on the top surface of water 50 as shown schematically in FIG. 3. Wide light pattern 60 is relatively easy to see from a distance at night and during other times when daylight is dim.

When light pattern 60 appears, a remote fisherman (not shown) can then easily determine that fishing apparatus 10 is upright and a fish has been hooked. The fisherman then rows or otherwise travels to fishing apparatus 10 and grasps floatation collar 16 to remove fishing apparatus 10 from water 50. Upon removal, reel 18 is dislodged from reel catch 19 and handle 20 used to wind line 21 onto reel 18 until hook 25 with fish 51 thereon is proximate eyelet 15 (see FIGS. 5A and 5B). Reel catch 19 can be rotated to again engage and lock reel 18 in place. Fish 51 can then be removed from hook 25 using top edge 71 of ice container 70 as shown for example in FIG. 5C as explained in more detail below.

Figure 5A:
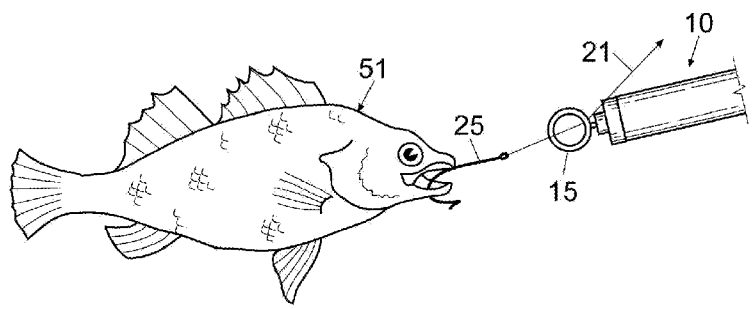
FIG. 5A demonstrates a partial view of the float fishing apparatus of FIG. 1 with a fish attached.
Figure 5B:
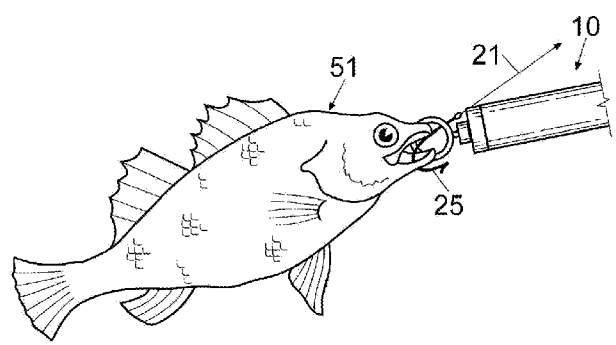
FIG. 5B shows the fish with the fishing line tightly wound.
Figure 5C:
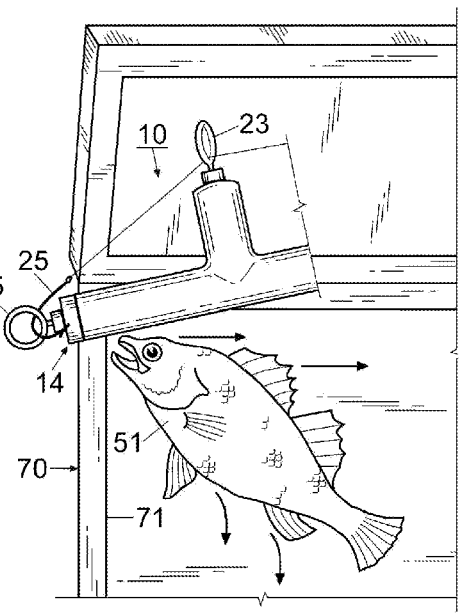
FIG. 5C depicts the fish as released from the hook by using the fishing apparatus on an edge of an open cooler seen in schematic fragmented view.

The method of dislodging fish 51 from hook 25 is shown schematically in FIGS. 5A, 5B and 5C. This method can be usually carried out without having to grab or touch fish 51 or hook 25. As shown in FIG. 5A, fish 51 is caught on hook 25 which passes through eyelet 15 on distal end 14 of shaft 11. Next, fishing line 21 is wound into close proximity with eyelet 15, with hook 25 engaging eyelet 15 as shown in FIG. 5B. Next, container 70 such as a typical cooler with water is then opened and fish 51 is lowered into container 70 as rigid shaft 11 is directed from container 70 as shown by arrow A in FIG. 5C. Fish 51, as it brushes against inside top edge 71 of container 70 is thus forced along hook 25 where it is released and falls into container 70. This process can be carried out quickly and with little experience and has proven to be very effective in removing fish 51 from hook 25. Hook 25 can be again baited, line 21 extended as desired, reel 18 locked in place by reel catch 19 and float fishing apparatus 10 repositioned horizontally in water 50 for further fishing.

The illustrations and examples provided herein are for explanatory purposes and are not intended to limit the scope of the appended claims.

I claim:

1. Float fishing apparatus comprising: a hollow shaft, a weight, said weight slidably contained within said shaft, a light assembly, said light assembly mounted proximate one end of said shaft, a reel, said reel rotatably attached to said shaft, a fishing line, said fishing line affixed to said reel, a hook, said hook attached to said fishing line, whereby a fish striking said hook will cause said weight to slide within said shaft and said shaft to upright from a horizontal posture to a vertical posture in the water.

2. The float fishing apparatus of claim 1 further comprising a reflector, said reflector positioned within said light assembly to reflect light therefrom.

3. The float fishing apparatus of claim 1 wherein said light assembly comprises a resilient housing.

4. The float fishing apparatus of claim 3 wherein said resilient housing is transparent.

5. The float fishing apparatus of claim 1 further comprising a reel catch, said reel catch attached to said reel.

6. The float fishing apparatus of claim 5 wherein said reel catch is pivotable.

7. The float fishing apparatus of claim 1 wherein said weight is cylindrically shaped.

8. The float fishing apparatus of claim 1 wherein said light assembly is battery operated.

9. The float fishing apparatus of claim 1 wherein said light assembly comprises a switch, an LED, said LED connected to said switch whereby depressing said switch will active said LED.

10. The float fishing apparatus of claim 1 further comprising a floatation collar, said floatation collar attached to said shaft, a reflective member, said reflective member attached to said floatation collar.

11. Float fishing apparatus comprising: a shaft, a light assembly, said light assembly mounted on one end of said shaft, a rotatable reel, said reel positioned on said shaft, a handle, said handle attached to said reel, a fishing line, said fishing line attached to said reel, an eyelet, said eyelet attached to said shaft in opposing relation to said light assembly for receiving said fishing line, a hook, said hook attached to said fishing line, said apparatus further comprising a weight, said weight slidably contained within said shaft.

12. The float fishing apparatus of claim 11 wherein said light assembly comprises a resilient housing, a penlight, said penlight comprising a barrel, an LED and a switch, said LED connected to said switch, said switch mounted on one end of said barrel in opposing relation to said LED, said penlight contained within said housing.

13. The float fishing apparatus of claim 12 further comprising a spacer, said spacer affixed to said barrel.

14. The float fishing apparatus of claim 12 further comprising a reflector, said reflector contained within said resilient housing.

15. A method of float fishing comprising the steps of:
a) providing a float fishing apparatus having a hollow shaft with a slideable weight therein and a floatation collar attached to the shaft, the shaft having a light assembly mounted on one end, a rotatable reel having a handle mounted on the shaft containing a fishing line and a hook;
b) unwinding the fishing line from the reel;
c) placing the float fishing apparatus horizontally in the water with bait attached to the hook and the light assembly activated;
d) allowing a fish to strike the bait to cause the weight to slide within the shaft; and
e) pivoting the float fishing apparatus to a vertical posture.

16. The method of claim 15 further comprising the step of removing the float fishing apparatus from the water.

17. The method of claim 15 further comprising the step of rotating the handle to wind the fishing line on the reel.

18. The method of claim 15 further comprising the step of removing a fish from the hook into a container.

19. The method of claim 15 wherein providing a float fishing apparatus comprises the steps of providing a float fishing apparatus having a resilient light housing, and squeezing the resilient light housing to activate the light assembly.

\* \* \* \* \*